(12) United States Patent
Bondivenne et al.

(10) Patent No.: US 12,055,101 B2
(45) Date of Patent: Aug. 6, 2024

(54) IGNITION METHOD AND DEVICE (71) Applicant: SAFRAN HELICOPTER ENGINES, Bordes (FR)

(72) Inventors: Eric Michel Bondivenne, Moissy Cramayel (FR); Vincent Poumarede, Moissy Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/260,880

(22) PCT Filed: Dec. 20, 2021

(86) PCT No.: PCT/FR2021/052409
§ 371 (c)(1),
(2) Date: Jul. 10, 2023

(87) PCT Pub. No.: WO2022/152989
PCT Pub. Date: Jul. 21, 2022

(65) Prior Publication Data
US 2024/0052783 A1 Feb. 15, 2024

(30) Foreign Application Priority Data

Jan. 15, 2021 (FR) ...................................... 2100369

(51) Int. Cl.
*F02C 7/266* (2006.01)
(52) U.S. Cl.
CPC ........ *F02C 7/266* (2013.01); *F05D 2220/329* (2013.01); *F05D 2260/85* (2013.01)

(58) Field of Classification Search
CPC .. F02C 7/26; F02C 7/262; F02C 7/264; F02C 7/266; F05D 2220/329; F05D 2260/85
See application file for complete search history.

(56) References Cited

U.S. PATENT DOCUMENTS 3,469,398 A 9/1969 Schafer
4,414,804 A * 11/1983 Menard ................... F02C 7/266
60/786

(Continued)

FOREIGN PATENT DOCUMENTS

BE 837 177 A 4/1976
FR 3 019 215 A1 10/2015

(Continued)

OTHER PUBLICATIONS

International Search Report as issued in International Patent Application No. PCT/FR2021/052409, dated Apr. 14, 2022.

*Primary Examiner* — Steven M Sutherland
(74) *Attorney, Agent, or Firm* — Pillsbury Winthrop Shaw Pittman LLP (57) ABSTRACT

A method for igniting a continuous combustion engine including an electronic engine control member, a high energy box, a spark plug ignition circuit and a fuel solenoid valve, cooperating with a starter motor, the method being implemented by the electronic engine control member and including precharging the high energy box before an engine starting procedure, activated on an engine starting command, the precharging being controlled by switching on the electronic engine control member, or by putting the engine in idle mode.

11 Claims, 5 Drawing Sheets

(56) References Cited

U.S. PATENT DOCUMENTS

| | | | | |
|---|---|---|---|---|
| 5,818,115 A | * | 10/1998 | Nagao | F02N 11/04 |
| | | | | 180/65.265 |
| 2006/0037304 A1 | * | 2/2006 | Mehrer | F02C 7/266 |
| | | | | 60/39.821 |
| 2013/0086919 A1 | * | 4/2013 | Dooley | B64C 27/12 |
| | | | | 60/778 |

FOREIGN PATENT DOCUMENTS

| | | | |
|---|---|---|---|
| FR | 3 092 147 A1 | 7/2020 |
| GB | 1 154 641 A | 6/1969 |
| GB | 1 537 278 A | 12/1978 |
| WO | WO 2014/133643 A2 | 9/2014 |

\* cited by examiner

IGNITION METHOD AND DEVICE

CROSS-REFERENCE TO RELATED APPLICATIONS

This application is the U.S. National Stage of PCT/FR2021/052409, filed Dec. 20, 2021, which in turn claims priority to French patent application number 2100369 filed Jan. 15, 2021. The content of these applications are incorporated herein by reference in their entireties.

TECHNICAL FIELD OF THE INVENTION

The technical field of the invention is that of continuous combustion engines, such as, for example, aeronautical turboshaft engines and more particularly those used for helicopters. The invention is concerned in particular with devices and methods for igniting these engines.

TECHNOLOGICAL BACKGROUND OF THE INVENTION

Ignition is conventionally carried out by virtue of a High Energy Box (HEB) which allows sparks to be struck at one or more spark plugs, located in the combustion chamber. The HEB is supplied by the host vehicle electrical network. In the case of an initial ground start, this power supply is only effective once all the starting accessories have also been supplied (starter motor, fuel solenoid valve). From the moment when supply begins, the electronics of the HEB are charged until they reach a level of energy sufficient to cause the spark plugs to breakdown (induced by the dielectric strength of the surrounding environment). A realistic order of magnitude for the charging time of a HEB is 0.5 s. No fuel ignition is possible during the charging time. The HEB (and more precisely its capacitor) is charged by virtue of a solid-state voltage booster supplied by the aircraft 28V on-board network. This makes it possible to reach high voltages required for the spark plug to breakdown, in the order of a few kV.

In addition, if the aircraft includes several engines, at least one engine may, during some phases of flight, be put into a so-called idle state, in which the starter motor remains switched on, but the fuel supply is cut off. The engine should then be able to be restarted in an emergency (leaving the idle mode by emergency activation within the scope of the 'SEO' Single Engine Operation concept, etc.). Restarting then mainly involves reopening the fuel solenoid valve and igniting the fuel. In this context, the charging time of the HEB for breaking down sparks becomes a particularly critical parameter.

SUMMARY OF THE INVENTION

The invention offers a solution to the problems discussed above, by enabling faster starting, by preparing the high energy box in advance, with a view to starting or restarting, making it possible to reduce the time between the moment when an engine start or restart command is received and
  the moment when ignition is effective for chambers with a reduced ignition window,
  the moment when the engine is able to deliver its power for Fast-Restart applications.

The ignition method according to the invention applies to a continuous combustion engine comprising an electronic engine control member, a high energy box, a spark plug ignition circuit and a fuel solenoid valve, cooperating with a starter motor, said method being characterised in that it is implemented by the electronic engine control member and that it includes a step of precharging the high energy box before an engine start step activated on an engine start command, said precharging step being controlled:
  by switching on the electronic engine control member or
  by putting the motor in idle mode.

During the first start (first case), the electronic engine control member is first switched on, then the starter motor and the high energy box are switched on and the fuel solenoid valve is controlled in the open state to supply the engine with fuel. While the high energy box is charging, the pressure rises in the combustion chambers, the electronic engine control member enables synchronisation by giving the start command when there is sufficient pressure in the chambers and the HEB is charged.

For a restart (second case), the engine is put in idle mode, that is the starter motor is kept on, the gas generator is kept rotating at low speed by virtue of the starter motor and the fuel solenoid valve is closed. During this idle mode, the HEB is charged and the starting step could then be activated.

The HEB is switched on via a first switch. In the first case, corresponding to the first engine start, the high energy box is supplied with electricity while the starter motor rises the pressure in the chamber and the fuel solenoid valve is open, enabling it to be charged in hidden time. In the second case, corresponding to putting the engine in idle mode, advantage is taken of the engine idle time to charge and maintain charging of the HEB, thereby optimising (shortening) the time required to ignite the engine in an emergency situation.

The method according to the invention makes it possible to control two operating modes of the HEB: a precharging mode and an operational, or breakdown, mode. The precharging mode is initiated when the engine's calculator is switched on, in the case of a first start; or when the engine switches to the idle mode, in which case the aim is to prepare for a future restart; in both cases, switching the EHB from precharging mode to breakdown operational mode is activated by the start or restart command.

Usually, in aeronautics, the HEB comprises a circuit for generating the high voltage from the low voltage supply provided by the on-board network, which comprises a voltage booster stage supplying a capacitive energy storage stage and a gas discharge tube (GDT). The spark plug ignition circuit comprises the spark plugs and the gas discharge tube (GDT) associated with an electronic power stage that develops the high voltage applied to the spark plug electrodes when the discharge tube breaks down. In other words, breakdown of the gas discharge tube ensures breakdown of the spark plugs. In a known way, the discharge tube makes it possible to homogenise the spark plug breakdown conditions by supplying an adapted high voltage whatever the atmospheric conditions in the engine combustion chamber.

The starting method according to the invention makes it possible, for example, to obtain:
  Maintenance at a high (total or partial) charge level in engine idle mode where an emergency restart may be required to allow an emergency restart in an optimal time.
  Full anticipation of charging the HEB in masked time before the engine start or restart command,
  Partial anticipation of charging the HEB in masked time before the engine start or restart command, Partial anticipation of charging the HEB in masked time enabling synchronisation with other factors contributing to starting, during an initial start (starter motor drive speed, fuel arrival, etc.).

In this way, the ignition delay becomes independent of the time taken for the HEB output voltage to build up to a predetermined breakdown voltage level. The time saved on the breakdown of the first spark can be as much as 80 to 90% of the charging time of the HEB, typically 0.4 to 0.45 s. This time saving between controlling the HEB and obtaining the 1st spark makes it possible to markedly improve performance of the function for automatically re-igniting engines that have been put in idle mode, which is particularly important for situations requiring an emergency restart to leave the SEO flight mode.

According to one aspect of the invention, the precharging step comprises a sub-step of measuring an output voltage U of the high energy box and a sub-step of controlling opening or closing of a first switch controlling supply to the high energy box as a function of the output voltage U of the high energy box. The output voltage of the high energy box HEB is taken to mean the voltage input to the gas discharge tube, that is the voltage across the energy storage element. The electronic engine control member may consist of the engine control calculator (commonly known as the FADEC for Full-Authority Digital Engine Controls); or it may consist of an assembly made up of a dedicated electronic circuit of the HEB and the engine control calculator, the electronic circuit being controlled by the engine control calculator. The first switch is controlled by the electronic engine control member, which measures the output voltage U of the high energy box and controls the first switch as a function of a voltage set-point. The electronic engine control member could thus open or close the first switch as a function of the output voltage level of the high energy box HEB, in order to reach and maintain the voltage set-point.

According to one first alternative, the first switch opens when the output voltage U becomes greater than or equal to a voltage set-point $U_{precharging}$ strictly lower than a breakdown voltage $U_{breakdown}$. The voltage set-point is a fraction of a breakdown voltage, the latter being the voltage required to produce a spark. Thus, the electrical supply to the high energy box stops as soon as U exceeds $U_{precharging}$, with $U_{precharging}$ equal to k $U_{breakdown}$, k being a real value strictly between 0.9 and 1, preferably between 0.95 and 0.98, inclusive of bounds. When the engine is in the idle state, the ignition time from an engine restart command will be shortened since the HEB will only need additional charging to reach the breakdown voltage level required for ignition. In the case of a first start, this facilitates synchronisation of starting accessories.

It has previously been explained that the HEB typically comprises a gas discharge tube (GDT) and the breakdown voltage required is the breakdown voltage of the gas discharge tube which is placed before the spark plugs. The breakdown voltage of the GDT is typically 1800 Volts or more, and up to 3000 V depending on the tube used. When the GDT breaks down, the spark plugs break down.

According to one second alternative, the first switch opens when the output voltage U becomes greater than or equal to the breakdown voltage $U_{breakdown}$ and a second switch located before the spark plug ignition circuit remains open until the engine start or restart command is given. In this alternative, the voltage set-point is the necessary breakdown voltage of the GDT. A second switch is then provided to isolate the high voltage generation circuit of the HEB from the spark plug ignition circuit during the precharge phase. The second switch, of the high voltage type, placed at the output of the high voltage generation circuit of the HEB, before the GDT, is naturally open and is closed on activation of the start command: as the output voltage of the HEB is already at the required breakdown level (that of the gas discharge tube), the HEB allows a spark to be produced as soon as the start command is received.

The invention also relates to an ignition device for a continuous combustion engine comprising a high energy box, an ignition circuit with spark plugs and a fuel solenoid valve cooperating with a starter motor, characterised in that it comprises an electronic engine control member implementing the method according to the invention, connected to a voltage output U of the high energy box and to the first switch allowing the high energy box to be supplied. The electronic circuit thus makes it possible to control opening and closing of the switch and thus to command and control charging of the HEB.

Advantageously, the high energy box is connected to the ignition circuit by a second switch. The second switch makes it possible, on a start command, to control ignition when the HEB is at a voltage $U_{breakdown}$.

Advantageously, the electronic circuit controls the second switch.

Advantageously, the electronic engine control member comprises a specific electronic circuit peculiar to the high energy box. It is thus possible to implement the method on an existing engine without having to reconfigure the engine control calculator or FADEC.

Advantageously, the second switch is in the open state during the precharging step and in the closed state at start-up. The switch switches from the open state to the closed state on a start or restart command according to the case.

The invention also relates to a turboshaft engine comprising the device with at least one of the preceding characteristics, and an aircraft comprising such a turboshaft engine. The aircraft may, for example, be a helicopter.

BRIEF DESCRIPTION OF THE FIGURES

The figures are set forth by way of indicating and in no way limiting purposes of the invention.

DETAILED DESCRIPTION

Unless otherwise specified, a same element appearing in different figures has a single reference.

Figure 1:
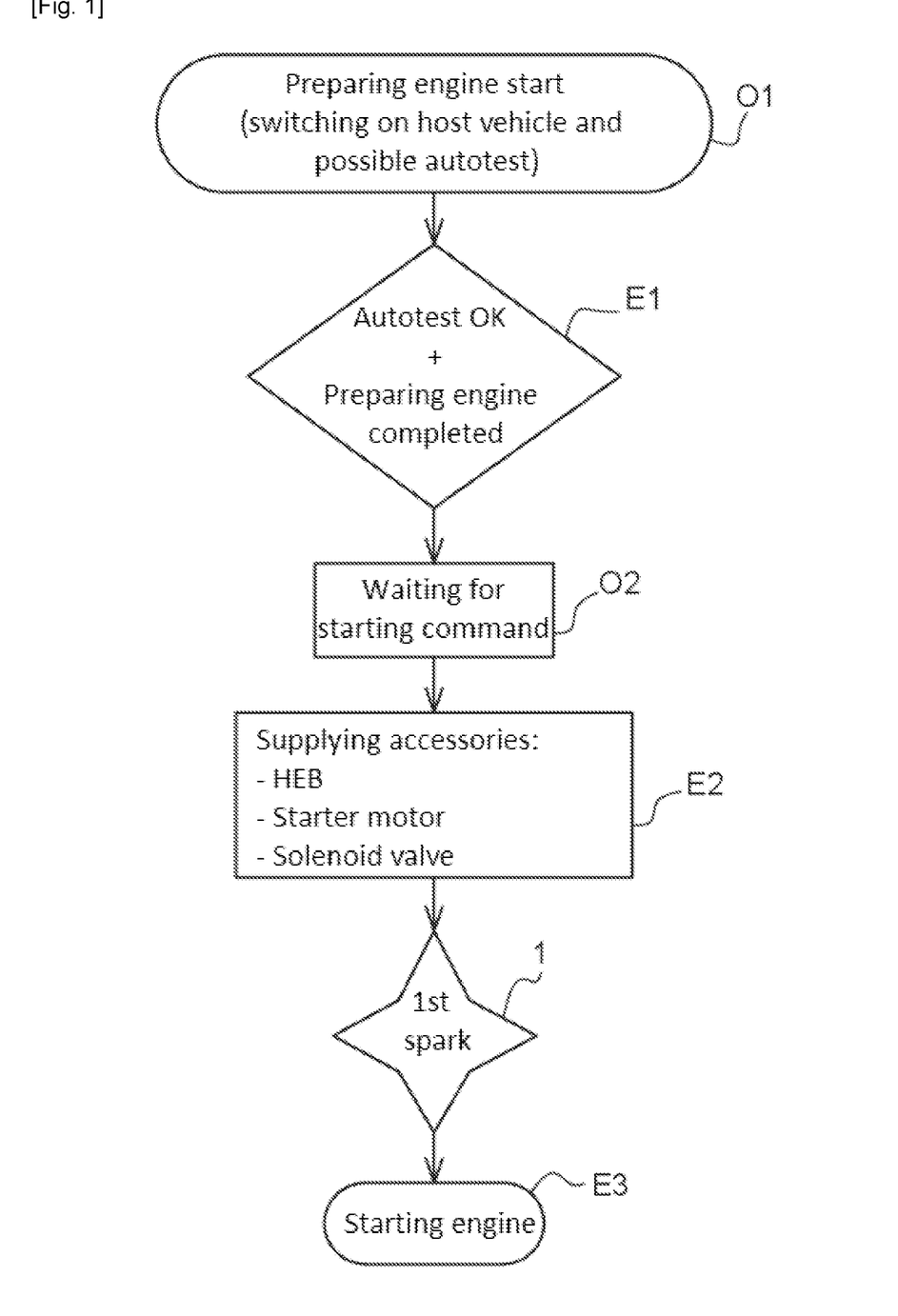
FIG. 1 is an operating flow chart of the ignition of the state of the art.

A method for igniting a continuous combustion engine according to the state of the art is illustrated in FIG. 1. When the vehicle is switched on O1, the electronic engine control member is switched on, a possible self-test and preparing the engine are carried out E1, the vehicle is ready to start. When the start command O2 is given by the pilot or the electronic engine control member, the HEB, all the starting accessories, that is the starter motor and the fuel solenoid valve, are supplied with electricity E2, the HEB is supplied via a switch directly driven by the start command O2. From this moment on, the high voltage converter of the HEB is supplied by the DC low voltage of the on-board electrical network, the high voltage storage element of the HEB, typically one or more capacitors, is (are) charging. The output voltage across the storage element rises to the required breakdown voltage level creating a first spark 1. Further sparks 1', 1" occur at approximately the same frequency until the engine E3 actually starts.

Figure 2:
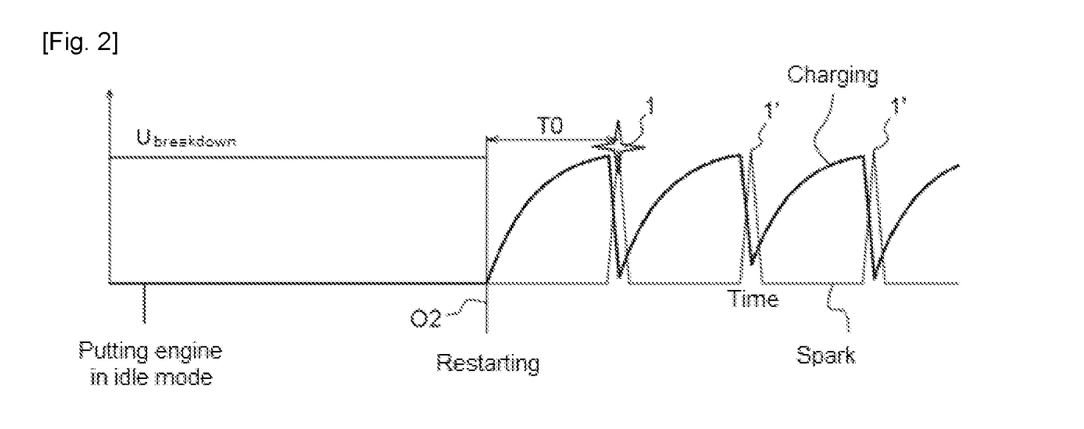
FIG. 2 is an operating time chart of the ignition of an engine in idle mode of the state of the art.

In FIG. 2, the charging time T0 of the HEB, which corresponds substantially to the time elapsed between the starting command O2 and the creation of the first spark, can thus be seen. This charging time T0 is a characteristic parameter of the electronics of the HEB considered. In practice, it is a function of the topology and performance and technological differences of the high-voltage converter components. The subsequent sparks 1', 1" occur at a frequency corresponding to this charging time T0 of the HEB.

The charging time sequence of the HEB for breaking down sparks is found in the event of restarting the engine when the latter has been put into a so-called idle state, by an idle command during a flight phase of the aircraft. The possibility of putting one of an aircraft engines into an idle state is especially used to reduce the aircraft fuel consumption and carbon footprint. In this idle state, the fuel solenoid valve is cut off, other starting conditions (air flow rate and pressure in the combustion chamber) being maintained, the starter motor being especially always switched on and driven so as to maintain the speed of the gas generator of the turboshaft engine within the optimum ignition window of the combustion chamber. In this state, it is possible, on an O2 start command from the pilot or the electronic engine control member, to reignite combustion and rapidly increase power. In other words, restarting the engine from idle requires refuelling and reactivating sparking. The time sequence described in connection with FIGS. 1 and 2, of supplying the HEB through the switch directly controlled by the start command to obtain the spark plug breakdown voltage is thus repeated. The time required to restart the engine then depends mainly on the charging time of the HEB that cannot be shortened.

In the different figures illustrating the invention, a HEB has been represented for 2 spark plugs, but it could be for 1, 2, . . . , n spark plugs.

Figure 3:
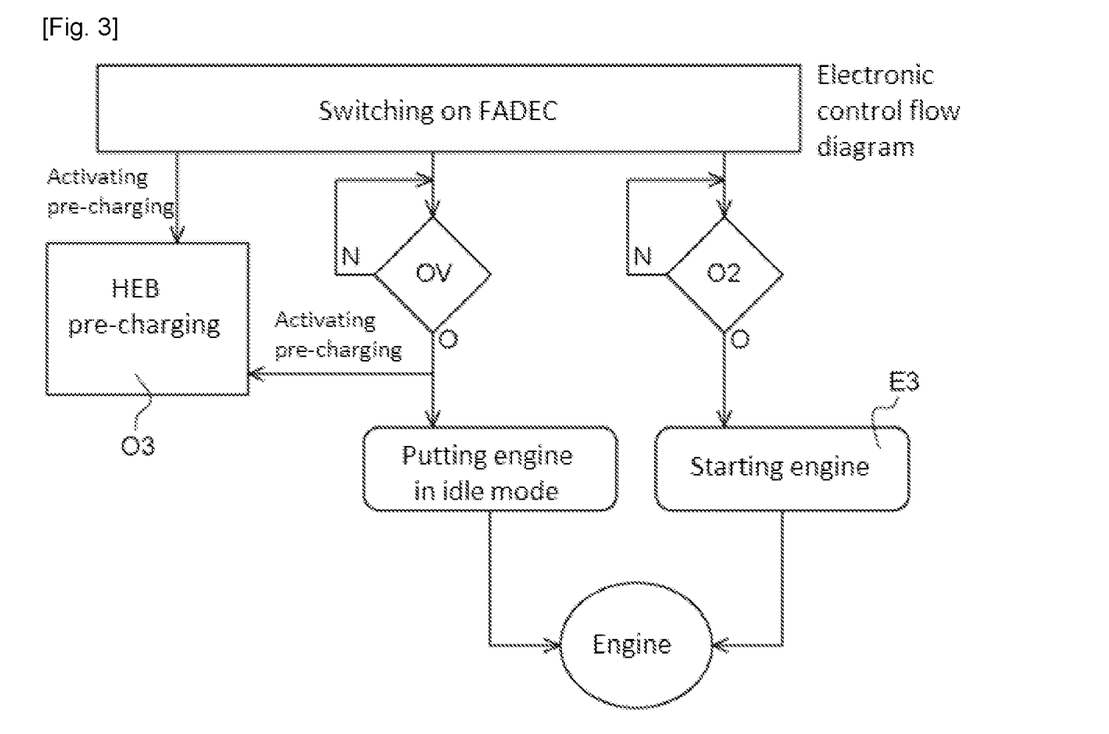
FIG. 3 is an operating flow chart of the ignition according to the invention.

The method according to the invention illustrated in FIG. 3 provides that switching on the electronic engine control member or switching the engine to idle mode on an idle command OV triggers switching on of the HEB allowing at least partial precharging O3 of the HEB and maintenance of this precharging throughout the engine idle time or combustion chamber pressurisation time. When a start command O2 is received, the remaining charging time of the HEB is significantly reduced, making it possible to accelerate occurrence of the first spark and therefore starting of the engine.

Thus, for a first start, the method is applied as follows: switching on the HEB is controlled by switching on the engine control electronics (engine calculator or by an electronic circuit specific to the HEB), allowing at least partial precharging O3 of the HEB before the engine start command O2. In particular, in this case, the HEB is supplied before the starter motor and the fuel solenoid valve.

Figure 4:
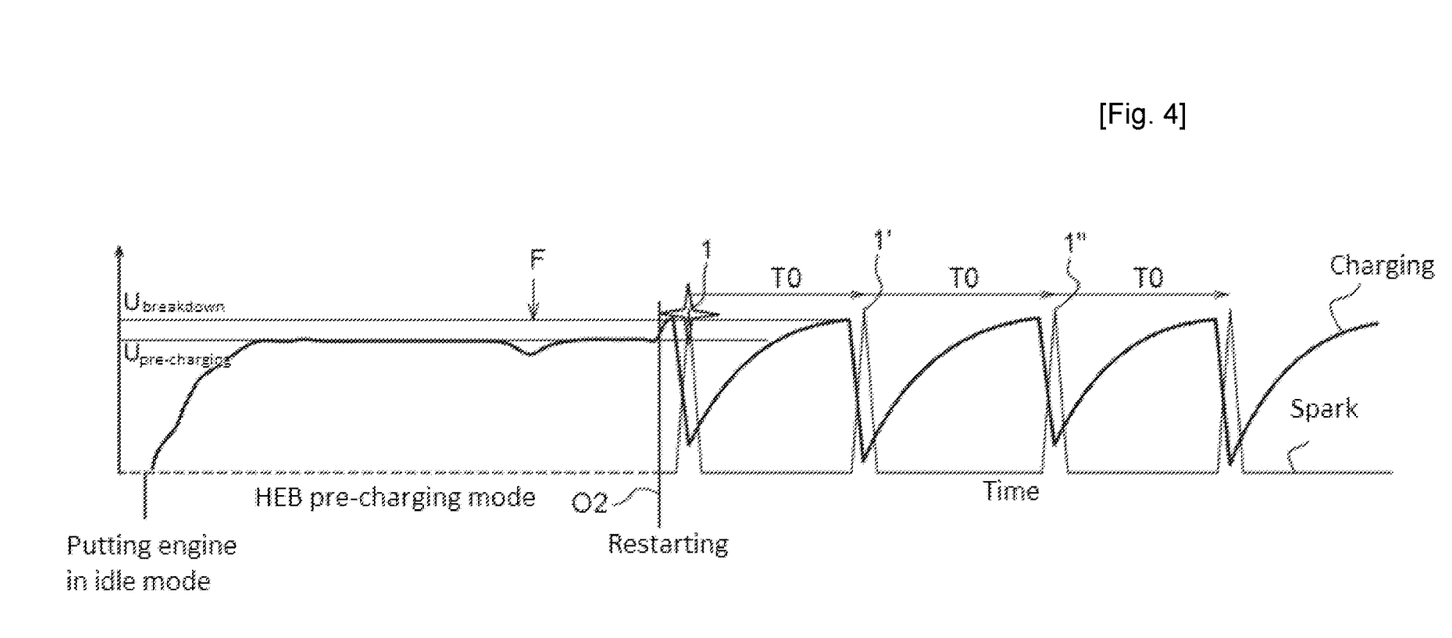
FIG. 4 is an operating time chart of the ignition of an engine in idle mode according to a first alternative of the invention with partial precharging.
Figure 5:
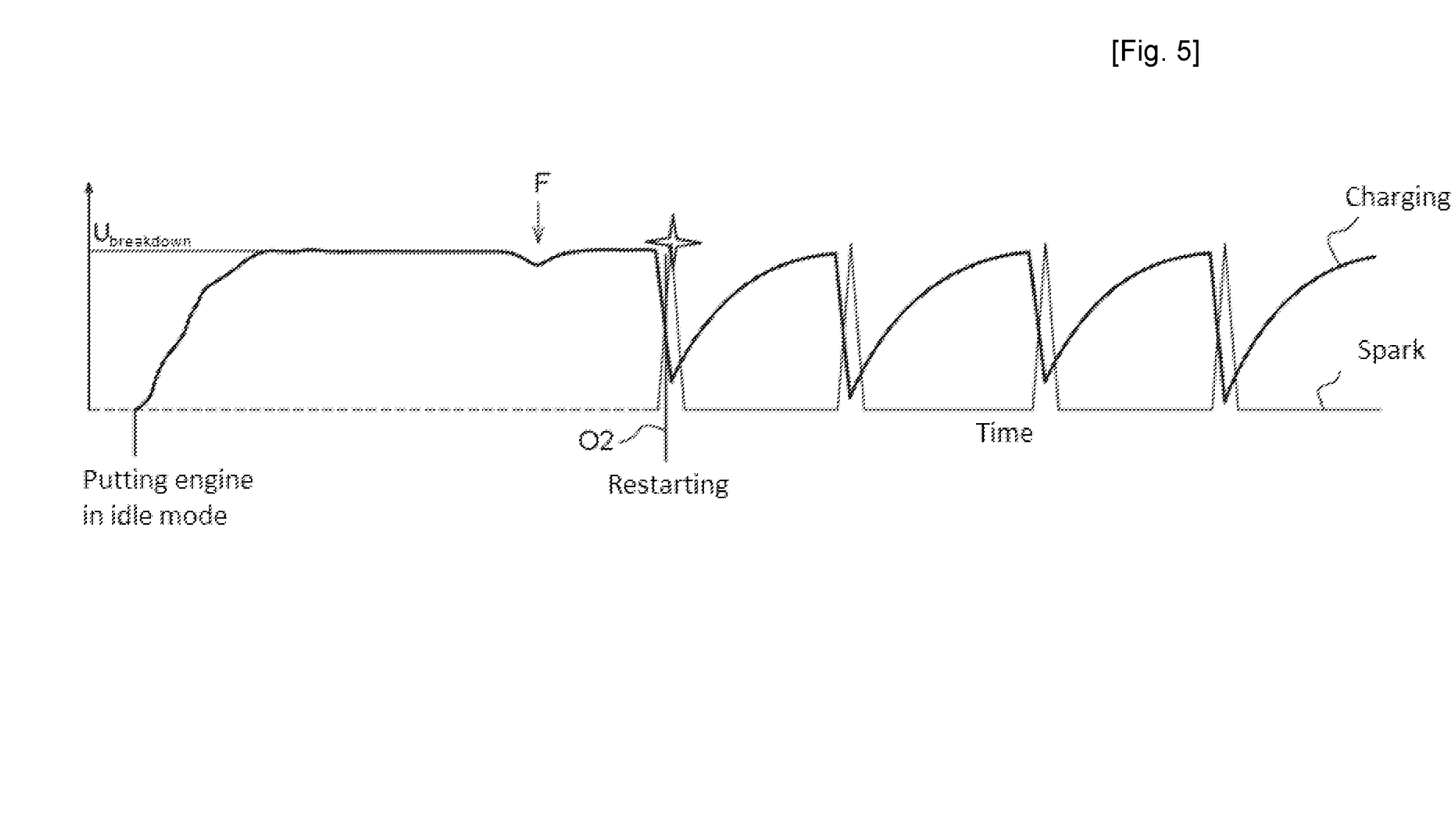
FIG. 5 is an operating time chart of the ignition of an engine in idle mode according to a second alternative of the invention with total precharging.

The time charts of FIGS. 4 and 5 illustrate the time saving made possible by the method of the invention in the time sequence for starting an engine switched to idle mode, with a precharge phase triggered by the engine idle command OV: the first spark 1 occurs very shortly after the start command O2. After this 1st spark, the following sparks 1', 1" break down at the same frequency as in the state of the art, corresponding to the charging time T0 of the HEB after each spark.

FIG. 4 corresponds to a first alternative implementation of the invention corresponding to partial precharging of the HEB during a precharging phase prior to the start command O2.

Figure 6:
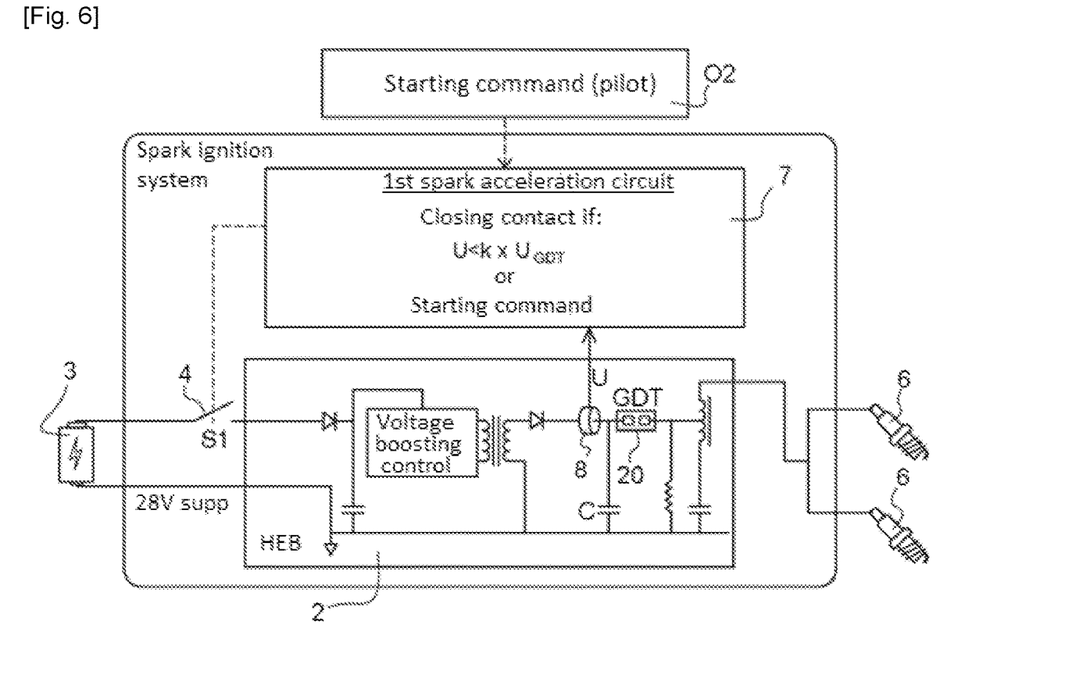
FIG. 6 is an electrical diagram of a device for controlling the HEB according to the first alternative of the invention.

A corresponding control device of the HEB is illustrated in FIG. 6.

The HEB 2 conventionally comprises a voltage booster stage charging a capacitive storage element represented by a capacitor C, a gas discharge tube 20 and a power output stage which supplies the high voltage applied to the spark plug electrodes. The supply input of the HEB 2 is connected to an electric power supply 3 (typically the low-voltage DC electrical network of the aircraft or vehicle) by a first, low-voltage switch 4, which is naturally in the open state; the voltage output U of the HEB 2 is measured across the capacitor C, at the input of the gas discharge tube 20. If voltage losses F occur, the device monitors the voltage U so as to set it to the value k×U.

In the case of continuous combustion engine systems or continuous combustion systems (water heater, boiler, etc.) for which atmospheric conditions are not critical and which would use a HEB without a gas discharge tube, the high voltage applied to the spark plugs is that supplied across the HEB storage element. The operation is quite similar: the supply input of the HEB 2 is connected to an electric power supply 3 (typically the low-voltage DC electrical network of the system) by the first, low-voltage switch 4, which is naturally in the open state; the voltage output U of the HEB 2 is measured across the capacitive storage element, corresponding in this case to the output of the HEB (before the spark plugs 6 of the ignition circuit).

According to the invention, the level of the output voltage U of the HEB 2 is measured by a sensor 8 and is controlled by an electronic engine control member 7 which drives and controls charging of the HEB by appropriately controlling opening and closing of the first switch 4.

As soon as the engine electronics is switched on, the electronic engine control member 7 is able to place the HEB in precharging mode at a voltage set-point. The electronic engine control member 7 is configured to measure the output voltage U of the HEB, typically by means of the sensor 8, and compare it with a voltage set-point $U_{precharging}$, which is set to a level close to but lower than the required breakdown threshold voltage level, $U_{breakdown}$. The required breakdown threshold voltage level is the minimum voltage level that enables the spark plugs to cause a spark in the combustion chamber, other fuel and compressed air conditions being otherwise met.

As long as the voltage U is below the voltage set-point, the electronic engine control member 7 drives the first switch in the closed state; as soon as the voltage set-point level is reached, it drives the first switch 4 in the open state.

If, for the duration of the precharging mode, the output voltage were to drop (for example due to losses in the high voltage capacitive storage stage) F, the electronic engine control member 7 is able to reactivate partial charging of the HEB by switching the first switch 4 back to the closed state. In practice, this situation relates to the case of an engine in idle mode instead, which can last for one hour or more.

In this first alternative, precharging the output voltage of the HEB 2 driven by the electronic engine control member 7 is partial.

When it receives the start command O2, the electronic engine control member 7 leaves the precharge control mode O3 of the HEB to switch to the operational control mode of the HEB allowing spark breakdown. In this mode, the first switch 4 is controlled or maintained in the closed state to supply power to the HEB 2.

As illustrated in FIG. 4, the voltage gap ($U_{breakdown} - U_{precharging}$) to be bridged to reach the breakdown voltage enabling breakdown of the first spark being small, the additional charging time t0 of the HEB from reception of the start command O2, to switch from the $U_{precharging}$ level to the $U_{breakdown}$ level is short compared with the charging time T0 corresponding to the complete excursion, from zero volts to $U_{breakdown}$. As soon as this breakdown voltage is reached, the first spark occurs. The subsequent sparks occur successively at the same frequency, corresponding to the charging time T0.

In practice, it is shown that 0.4 to 0.45 s can be saved in charging time from the reception of the start command, that is a saving of 80 to 90% on the time taken to produce the first spark compared with the conventional ignition method. This gain is invaluable in some critical operational situations, in the context of aircraft with several engines and designed to allow at least one of the engines to switch to idle mode during some flight phases, to save fuel and reduce their carbon footprint. As already explained, in the event of an emergency (climatic conditions, engine failure, etc.) it must be possible to switch the engine(s) back on and restore power very quickly.

Synchronisation of the different ignition conditions in the combustion chamber: fuel, compressed air, spark (spark plugs) is also facilitated. This makes engine starting (first start) more reliable.

A second alternative implementation of the invention is illustrated in FIG. 5, corresponding to a voltage set-point equal to the breakdown voltage. The electronic engine control member 7 is then configured to control "total" precharging O3 of the HEB. Namely the electronic engine control member 7 compares the output voltage U of the HEB with a voltage level which is the required breakdown threshold voltage level $U_{breakdown}$.

Figure 7:
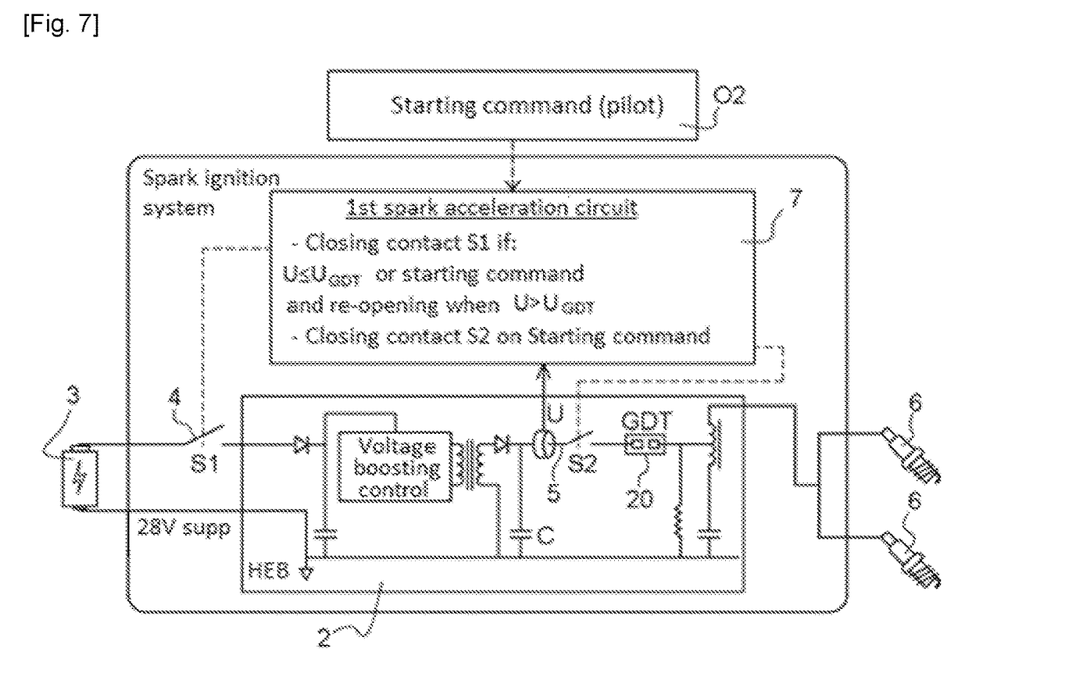
FIG. 7 is an electrical diagram of a device for controlling the HEB according to the second alternative of the invention.

A second switch 5, of the high voltage type, is then provided at the output of the HEB 2, so as to isolate the circuit for generating and storing the high voltage of the HEB 2 from the spark plug ignition circuit 6 during the precharging mode, before a start command O2 from the pilot. This second switch 5 is naturally in the open state and remains open in HEB precharging mode. It is controlled by the electronic engine control member 7 in the closed state as soon as a start command signal O2 from the pilot is received, until the engine is ignited.

In the case where the precharging mode of the HEB according to the invention is used for a first engine start, synchronisation of the ignition conditions is facilitated by the presence of this second switch 5, while the HEB is precharged to the necessary breakdown voltage: the second switch 5 makes it possible to control the moment when the breakdown voltage is provided to the spark plugs 6, the switching time of the second switch being negligible.

The invention claimed is:

1. A method for igniting a continuous combustion engine comprising an electronic engine control member, a high energy box, a spark plug ignition circuit and a fuel solenoid valve, cooperating with a starter motor, said method being implemented by the electronic engine control member and comprising a step of precharging the high energy box before an engine starting step, the engine starting step being activated on an engine starting command, said step of precharging being controlled:

by switching on the electronic engine control member, or
by putting the continuous combustion engine in idle mode.

2. The method according to claim 1, wherein the step of precharging comprises a measurement of an output voltage of the high energy box and a command to open or close a first switch controlling a power supply to the high energy box as a function of the output voltage of the high energy box.

3. The method according to claim 2, wherein the first switch opens when the output voltage becomes greater than or equal to a voltage set-point $U_{precharging}$ strictly lower than a breakdown voltage $U_{breakdown}$, the latter being a voltage required to produce a spark.

4. The method according to claim 2, wherein the first switch opens when the output voltage becomes greater than or equal to a breakdown voltage $U_{breakdown}$, $U_{breakdown}$ being a voltage necessary to produce a spark, and wherein a second switch disposed before the spark plug ignition circuit remains open until the engine starting command.

5. A device for igniting the continuous combustion engine comprising the high energy box, the spark plug ignition circuit, and the fuel solenoid valve, cooperating with the starter motor, the device comprising the electronic engine control member adapted to implement the method according to claim 2, connected to a voltage output of the high energy box and to the first switch allowing the high energy box to be supplied.

6. The device according to claim 5, wherein the high energy box is connected to the spark plug ignition circuit via a second switch.

7. The device according to claim 6, wherein the electronic engine control member controls the second switch.

8. The device according to claim 6, wherein the second switch is in an open state during the step of precharging and in a closed state at start-up.

9. A turboshaft engine comprising the device according to claim 5.

10. An aircraft comprising a turboshaft engine according to claim 9.

11. The device according to claim 5, wherein the electronic engine control member comprises an electronic circuit for the high energy box.

* * * * *